US007937427B2

(12) United States Patent
Chester et al.

(10) Patent No.: US 7,937,427 B2
(45) Date of Patent: May 3, 2011

(54) DIGITAL GENERATION OF A CHAOTIC NUMERICAL SEQUENCE

(75) Inventors: David B. Chester, Palm Bay, FL (US); Alan J. Michaels, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 988 days.

(21) Appl. No.: 11/737,459

(22) Filed: Apr. 19, 2007

(65) Prior Publication Data

US 2008/0263119 A1    Oct. 23, 2008

(51) Int. Cl.
*G06F 1/02*    (2006.01)
*H04L 9/00*    (2006.01)
(52) U.S. Cl. ........................... 708/250; 708/253; 380/46
(58) Field of Classification Search .................. 708/250, 708/252; 380/46
See application file for complete search history.

(56) References Cited

U.S. PATENT DOCUMENTS

| | | | |
|---|---|---|---|
| 3,564,223 A | 2/1971 | Harris et al. | |
| 4,646,326 A | 2/1987 | Backof, Jr. et al. | |
| 4,703,507 A | 10/1987 | Holden | |
| 5,077,793 A | 12/1991 | Falk et al. | |
| 5,276,633 A | 1/1994 | Fox et al. | |
| 5,297,153 A | 3/1994 | Baggen et al. | |
| 5,297,206 A | 3/1994 | Orton | |
| 5,319,735 A | 6/1994 | Preuss et al. | |
| 5,412,687 A | 5/1995 | Sutton et al. | |
| 5,598,476 A | 1/1997 | LaBarre et al. | |
| 5,757,923 A * | 5/1998 | Koopman, Jr. | 380/46 |
| 5,811,998 A | 9/1998 | Lundberg et al. | |
| 5,852,630 A | 12/1998 | Langberg et al. | |
| 5,900,835 A | 5/1999 | Stein | |
| 5,924,980 A | 7/1999 | Coetzee | |
| 5,937,000 A | 8/1999 | Lee et al. | |
| 6,014,446 A * | 1/2000 | Finkelstein | 380/46 |
| 6,023,612 A | 2/2000 | Harris et al. | |
| 6,038,317 A | 3/2000 | Magliveras et al. | |

(Continued)

FOREIGN PATENT DOCUMENTS

EP    0 849 664 A2    6/1998

(Continued)

OTHER PUBLICATIONS

Joan Boyar, "Inferring Squences Produced by Pseudo-Random Number Generators", Journal of the Association for Computing Machine, vol. 36, No. 1. pp. 20-41, 1989.*

(Continued)

*Primary Examiner* — Chuong D Ngo
(74) *Attorney, Agent, or Firm* — Fox Rothschild, LLP; Robert J. Sacco

(57) ABSTRACT

A method is provided for generating a chaotic sequence. The method includes selecting a plurality of polynomial equations. The method also includes using residue number system (RNS) arithmetic operations to respectively determine solutions for the polynomial equations. The solutions are iteratively computed and expressed as RNS residue values. The method further includes determining a series of digits in a weighted number system (e.g., a binary number system) based on the RNS residue values. According to an aspect of the invention, the method includes using a Chinese Remainder Theorem process to determine a series of digits in the weighted number system based on the RNS residue values. According to another aspect of the invention, the determining step comprises identifying a number in the weighted number system that is defined by the RNS residue values.

29 Claims, 4 Drawing Sheets

U.S. PATENT DOCUMENTS

| | | | |
|---|---|---|---|
| 6,078,611 | A | 6/2000 | La Rosa et al. |
| 6,331,974 | B1 | 12/2001 | Yang et al. |
| 6,377,782 | B1 | 4/2002 | Bishop et al. |
| 6,570,909 | B1 | 5/2003 | Kansakoski et al. |
| 6,614,914 | B1 | 9/2003 | Rhoads et al. |
| 6,744,893 | B1 | 6/2004 | Fleming-Dahl |
| 6,754,251 | B1 | 6/2004 | Sriram et al. |
| 6,766,345 | B2 | 7/2004 | Stein et al. |
| 6,842,479 | B2 | 1/2005 | Bottomley |
| 6,986,054 | B2 | 1/2006 | Kaminaga et al. |
| 7,023,323 | B1 | 4/2006 | Nysen |
| 7,027,598 | B1 | 4/2006 | Stojancic et al. |
| 7,069,492 | B2 | 6/2006 | Piret et al. |
| 7,076,065 | B2 | 7/2006 | Sherman et al. |
| 7,078,981 | B2 | 7/2006 | Farag |
| 7,079,651 | B2 | 7/2006 | Den Boer et al. |
| 7,095,778 | B2 | 8/2006 | Okubo et al. |
| 7,190,681 | B1 | 3/2007 | Wu |
| 7,200,225 | B1 | 4/2007 | Schroeppel |
| 7,233,969 | B2 | 6/2007 | Rawlins et al. |
| 7,233,970 | B2 | 6/2007 | North et al. |
| 7,269,198 | B1 | 9/2007 | Elliott et al. |
| 7,529,292 | B2 | 5/2009 | Bultan et al. |
| 7,643,537 | B1 | 1/2010 | Giallorenzi et al. |
| 7,779,060 | B2 * | 8/2010 | Kocarev et al. ............... 708/250 |
| 2002/0099746 | A1 | 7/2002 | Tie et al. |
| 2003/0044004 | A1 | 3/2003 | Blakley et al. |
| 2004/0001556 | A1 | 1/2004 | Harrison et al. |
| 2004/0059767 | A1 | 3/2004 | Liardet |
| 2004/0196212 | A1 | 10/2004 | Shimizu |
| 2005/0031120 | A1 | 2/2005 | Samid |
| 2005/0050121 | A1 | 3/2005 | Klein et al. |
| 2005/0207574 | A1 | 9/2005 | Pitz et al. |
| 2005/0274807 | A1 | 12/2005 | Barrus et al. |
| 2006/0123325 | A1 | 6/2006 | Wilson et al. |
| 2006/0209932 | A1 | 9/2006 | Khandekar et al. |
| 2006/0251250 | A1 | 11/2006 | Ruggiero et al. |
| 2008/0016431 | A1 | 1/2008 | Lablans |
| 2008/0095215 | A1 | 4/2008 | McDermott et al. |
| 2008/0198832 | A1 | 8/2008 | Chester |
| 2008/0263119 | A1 | 10/2008 | Chester et al. |
| 2008/0294710 | A1 | 11/2008 | Michaels |
| 2008/0294956 | A1 | 11/2008 | Chester et al. |
| 2008/0304553 | A1 | 12/2008 | Zhao et al. |
| 2008/0304666 | A1 | 12/2008 | Chester et al. |
| 2008/0307022 | A1 | 12/2008 | Michaels et al. |
| 2008/0307024 | A1 | 12/2008 | Michaels et al. |
| 2009/0034727 | A1 | 2/2009 | Chester et al. |
| 2009/0044080 | A1 | 2/2009 | Michaels et al. |
| 2009/0110197 | A1 | 4/2009 | Michaels |
| 2009/0122926 | A1 | 5/2009 | Azenkot et al. |
| 2009/0196420 | A1 | 8/2009 | Chester et al. |
| 2009/0202067 | A1 | 8/2009 | Michaels et al. |
| 2009/0245217 | A1 | 10/2009 | Michaels |
| 2009/0279688 | A1 | 11/2009 | Michaels et al. |
| 2009/0279690 | A1 | 11/2009 | Michaels et al. |
| 2009/0296860 | A1 | 12/2009 | Chester et al. |
| 2009/0300088 | A1 | 12/2009 | Michaels et al. |
| 2009/0310650 | A1 | 12/2009 | Chester et al. |
| 2009/0323766 | A1 | 12/2009 | Wang et al. |
| 2009/0327387 | A1 | 12/2009 | Michaels et al. |
| 2010/0111296 | A1 | 5/2010 | Brown et al. |

FOREIGN PATENT DOCUMENTS

| | | |
|---|---|---|
| EP | 0 949 563 | 10/1999 |
| EP | 2 000 900 | 12/2008 |
| EP | 2 000 902 A2 | 12/2008 |
| GB | 1167272 A | 10/1969 |
| WO | WO-0135572 A2 | 5/2001 |
| WO | WO-2006 110954 | 10/2006 |
| WO | WO-2008065191 A1 | 6/2008 |
| WO | WO-2008099367 A2 | 8/2008 |
| WO | WO-2008130973 A1 | 10/2008 |
| WO | WO-2009146283 A1 | 12/2009 |

OTHER PUBLICATIONS

U.S. Appl. No. 11/759,273, David Chester et al.
U.S. Appl. No. 11/832,160, David Chester et al.
Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.
Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004, XPOO2558039.
Manikandan, et al, "A Novel Pulse Based Ultrawide Band System Using Chaotic Spreading Sequences" Communication Systems Software and Middleware, 2007. COMSWARE 2007. 2nd International Conference on, IEEE, PI, Jan. 1, 2007, pp. 1-5, XP031113946 ISBN: 978-1-4244-0613-5; p. 1, p. 5.
Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Apr. 8, 2009] p. 47-p. 48; p. 50-p. 51.
Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.
Barile, Margherita, "Bijective," From MathWorld—A Wolfram Web Resource, created by Eric W. Weisstein. http://mathworld.wolfram.com/Bijective.html, 2002.
Weisstein, Eric W., "Injection," From MathWorld—A Wolfram Web Resource. http://mathworld.wolfram.com/Injection.html, 2005.
Weisstein, Eric W. "Surjection," From MathWorld—A Wolfram Web Resource, http://mathworld.wolfram.com/Surjection.html, 2002.
Yen, et al., (1999) "Residual Number System Assisted CDMA: A New System Concept", In: ACTS'99, Jun. 8-11, 1999, Sorrento, Italy.
Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.
Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.
Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.
Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].
Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.
De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.
Knuth, D.E., "The Art of Computer Programming, Third Edition; vol. 2 Seminumerical Algorithms". Feb. 2005, Addison-Wesley, Boston 310200, XP002511903, pp. 142-146, 284-292.
Pleszczynski, S, "On the Generation of Permutations" Information Processing Letters, Amsterdam, NL, vol. 3, No. 6, Jul. 1, 1975, pp. 180-183, XP008023810, ISSN: 0020-0190.
Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.
Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Vanwiggeren, et al., "Chaotic Communiction Using Time-Delayed Optical Systems", International Journal of Bifurcation and Chaos, vol. 9, No. 11 (1999) pp. 2129-2156, World Scienfitic Publishing Company.

Morsche, et al., "Signals and Systems", lecture notes, University of Eindhoven, The Netherlands, 1999.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

Michaels, et al., U.S. Appl. No. 12/056,024, filed Mar. 26, 2008, entitled "Selective Noise Cancellation Of A Spread Spectrum Signal".

Michaels, et al., U.S. Appl. No. 12/117,086, filed May 8, 2008, Entitled "Cryptographic System Including a Mixed Radix Number Generator With Chosen Statistical Artifacts".

Chester, et al., U.S. Appl. No. 12/116,104, filed May 6, 2008, Entitled, "A Closed Galois Field Cryptographic System".

Chester, et al., U.S. Appl. No. 12/131,386, filed Jun. 2, 2008, Entitled "Adaptive Correlation".

Chester, et al., U.S. Appl. No. 12/137,593, filed Jun. 12, 2008, entitled "Featureless Coherent Chaotic Amplitude Modulation".

Michaels, et al., U.S. Appl. No. 12/129,197, filed May 29, 2008, entitled "Digital Generation of an Accelerated or Decelerated Chaotic Numerical Sequence".

Michaels, et al., U.S. Appl. No. 12/129,654, filed May 29, 2008, entitled "Sine/Cosine Generator".

Michaels, et al., U.S. Appl. No. 12/496,214, filed Jul. 1, 2009, entitled "Anti-Jam Communications Having Selectively Variable PAPR Including CAZAC Waveform".

Michaels, et al., U.S. Appl. No. 12/507,111, filed Jul. 22, 2009, entitled "Anti-Jam Communications Using Adaptive Chaotic Spread Waveform".

Chester, at al., U.S. Appl. No. 12/480,264, filed Jun. 8, 2009, entitled "Continuous Time Chaos Dithering".

Chester, at al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission-Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "AD-HOC Network Acquisition Using Chaotic Sequence Spread Waveform".

Michaels, Alan, U.S. Appl. No. 12/201,021, filed Aug. 29, 2008, entitled, Multi-Tier AD-HOC Network Communications.

Aparicio; "Communications Systems Based on Chaos" May 2007. Universidad Rey Juan Carlos.

Bererber, S.M., et al., "Design of a CDMA System in FPGA Technology", Vehicular Technology Conference, 2007. VTC2007-Spring. IEEE 65th Apr. 22, 2007, Apr. 25, 2007, pp. 3061-3065, XP002575053 Dublin ISBN: 1-424-40266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. 1-1_1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON 2002 Oct. 2, 2002, Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From Math World-A Wolfram Web Resource, created by Eric W. Weisstein, [online] [retrieved on Nov. 8, 2010] Retrieved from the Internet: <<http://mathworld.wolfram.com/Bijective.html>>.

Weisstein, E., Surejection:, From MathWorld-AWolfram Web Resource [online] [retrieved on Nov. 8, 2010] Retrieved from the Internet: <<http://mathworld.wolfram.com/surjection.html>>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/US2009/0069118.

Harris Corp., European Search Report mailed Mar. 4, 2010, Patent Application No. 08009745.4.

* cited by examiner

DIGITAL GENERATION OF A CHAOTIC NUMERICAL SEQUENCE

BACKGROUND OF THE INVENTION

1. Statement of the Technical Field

The invention concerns numerical sequence generation. More particularly, the invention concerns a method for digitally generating a chaotic numerical sequence.

2. Description of the Related Art

Chaotic systems can generally be thought of as systems which vary unpredictably due to the defining characteristics of: sensitivity to initial conditions; being dense; and being topological transitive. The characteristics of denseness and topological transitivity mean that the resultant numerical values generated by a chaotic circuit do not clump together. When measured or observed, chaotic systems do not reveal any discernible regularity or order. Chaotic systems are distinguished by a sensitive dependence on a set of initial conditions and by having an evolution through time and space that appears to be quite random. However, despite its "random" appearance, chaos is a deterministic evolution.

There are many types of chaotic communications systems known in the art. Such chaotic communications systems include a chaotic spreading based communications system, a coherent chaos shift keying based communications system, a non-coherent chaos shift keying based communications system, and a differential code shift keying (DCSK) based communications system. Such chaotic communications systems also include a chaotic on-off keying based communications system, a frequency-modulated DCSK based communications system, a correlation delay shift keying based communications system, a symmetric code shift keying (CSK) based communications system, and a quadrature CSK based communications system.

Chaotic communications systems offer promise for being the basis of a next generation of low probability of intercept (LPI) waveforms, low probability of detection (LPD) waveforms, and secure waveforms. White many chaotic communications systems have been developed for generating chaotically modulated waveforms, such chaotic communications systems suffer from low throughput. The term "throughput" as used herein refers to the amount of payload data transmitted over a data link during a specific amount of time.

The throughput limitation with chaos based communication systems can be traced to the way in which chaos generators have been implemented. Chaos generators have been conventionally constructed using analog chaotic circuits. The reason for reliance on analog circuits for this task has been the widely held conventional belief that efficient digital generation of chaos is impossible. Notwithstanding the apparent necessity of using analog type chaos generators, that approach has not been without problems. For example, analog chaos generator circuits are known to drift over time. The term "drift" as used herein refers to a slow long term variation in one or more parameters of a chaotic signal. Another problem with such analog circuits is that state information must be constantly transferred over a communication channel to keep a transmitter and receiver synchronized, thereby reducing data throughput. Still another problem with analog chaotic circuits is that their rate of advancement from state to state is fixed by the physical characteristics of the circuit and is not easily verified.

The transmitter and receiver in chaos based communication systems are often synchronized by exchanging state information over a data link. Such synchronization can reduce the problems associated with drift by communicating updated state information. However, such a synchronization process offers diminishing return because state information must be exchanged more often between the transmitter and the receiver to obtain a high data rate. This high data rate results in a faster relative drift. In effect, state information must be exchanged at an increased rate between the transmitter and receiver to counteract the faster relative drift. Although some chaotic communications systems employ a relatively efficient synchronization process, these chaotic communications systems still suffer from low throughput.

Communications systems may use multiple pseudo-random number generators to generate a digital chaotic-like sequence. However, such communications systems only produce more complex pseudo-random number sequences that possess all pseudo-random artifacts and no true chaotic properties. While certain polynomials can mimic chaotic behavior, the arithmetic precision required to generate chaotic number sequences requires an impractical implementation. Stated differently, the binary arithmetic necessary in order to achieve digital chaos is prohibitive.

In view of the forgoing, there is a need for a chaotic communications system having an increased throughput. There is also a need for a chaotic communications system configured for generating a signal having chaotic properties. As such, there is further a need for a chaotic communications system that offers state drift and update properties that are more favorable to high data rate applications. Most significantly, there is a need for a method for digitally generating a chaotic number sequence that can be used for a variety of communications system applications.

SUMMARY OF THE INVENTION

A method is provided for generating a chaotic sequence. The method includes selecting a plurality of polynomial equations. The method also includes using residue number system (RNS) arithmetic operations to respectively determine solutions for the polynomial equations. The solutions are iteratively computed and expressed as RNS residue values. The method further includes determining a series of digits in a weighted number system (e.g., a binary number system) based on the RNS residue values.

According to an aspect of the invention, the method includes using a Chinese Remainder Theorem process to determine a series of digits in the weighted number system based on the RNS residue values. According to another aspect of the invention, the determining step comprises identifying a number in the weighted number system that is defined by the RNS residue values.

According to another aspect of the invention, the determining step comprises identifying a truncated portion of a number in the weighted number system that is defined by the RNS residue values. The truncated portion is selected to include any serially arranged set of digits comprising a portion of the number in the weighted number system. The truncated portion is selected exclusive of a most significant digit of the number in the weighted number system.

According to another aspect of the invention, the method includes selecting a value for each of N moduli in a RNS used for solving each of the polynomial equations. The method also includes selecting each modulus for each of the polynomial equations so that each polynomial equation is irreducible. The method further includes selecting each modulus for each of polynomial equations so that solutions iteratively computed via a feedback mechanism for the polynomial equations are chaotic.

According to another aspect of the invention, the method includes selecting the polynomial equations to include at least a cubic type polynomial equation. The method also includes selecting each of the polynomial equations to be identical exclusive of a constant value. The constant value is selected so that the polynomial equation is irreducible for a predefined modulus. The polynomial equations are also selected to be a constant or varying function of time.

According to another aspect of the invention, the method includes iteratively computing the solutions using a feedback mechanism. The feedback mechanism is selected to include selectively defining a value of a variable of a polynomial equation for each solution iteratively computed. The value is based on a previous iteratively computed solution of the polynomial equation.

A chaotic sequence generator is also provided. The chaotic sequence generator is comprised of a computing means. The computing means is configured to use residue number system (RNS) arithmetic operations to respectively determine solutions for two or more polynomial equations. The solutions are iteratively computed and expressed as RNS residue values. The chaotic sequence generator is further comprised of a mapping means. The mapping means is configured to determine a series of digits in the weighted number system based on the RNS residue values.

According to an aspect of the invention, the mapping means is configured to determine a series of digits in the weighted number system based on the RNS residue values using a Chinese Remainder Theorem process. The mapping means is also configured to identify a number in the weighted number system that is defined by the RNS residue values. The mapping means is further configured to identify a truncated portion of a number in the weighted number system that is defined by the RNS value.

According to another aspect of the invention, the mapping means is configured to select the truncated portion to include any serially arranged set of digits. The set of digits are comprised of a portion of the number in the weighted number system. The mapping means is also configured to select the truncated portion to be exclusive of a most significant digit when all possible weighted numbers represented by P bits are not mapped, i.e. when $M-1<2^P$. P is a fewest number of bits required to achieve a binary representation of the weighted numbers. The most significant digit is comprised of a number in the weighted number system.

According to another aspect of the invention, the computing means is configured to utilize modulus selected for each polynomial equation so that each polynomial equation is irreducible. The computing means is further configured to utilize a modulus selected for each polynomial equation so that solutions iteratively computed via a feedback mechanism are chaotic. The polynomial equations include at least a cubic type polynomial equation. The polynomial equations are identical exclusive of a constant value. The polynomial equations are one of a constant or varying function of time.

According to yet another aspect of the invention, the chaotic sequence generator is further comprised of a feedback mechanism. The feedback mechanism is configured to selectively define a variable "x" of a polynomial equation as a solution computed in a previous iteration.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The present invention concerns a method for generating a chaotic sequence which can be used in various types of chaos based communications systems. Such chaos based communications systems include a chaotic signal spreading based communications system, a coherent chaos shift keying based communications system, a non-coherent chaos shift keying based communications system, and a differential code shift keying (DCSK) based communications system. Such chaotic communications systems also include a chaotic on-off keying based communications system, a frequency-modulated DCSK based communications system, a correlation delay shift keying based communications system, a symmetric code shift keying (CSK) based communications system, and a quadrature CSK based communications system.

It will be appreciated that each of the foregoing chaos based communications systems requires a chaos generator which is capable of producing a chaotic sequence. A chaotic sequence, as that term is used herein, is a signal having a time varying value expressed in analog or digital form that has no discernible regularity or order. Those skilled in the art will readily appreciate that the chaotic sequence can be used in a variety of ways, depending on the particular type of chaotic communications system which is desired for implementation.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Some embodiments of the present invention provide a method for digitally generating a chaotic sequence. In this regard, it should be appreciated that the presence of any discernible pattern in a chaotic sequence is much more difficult to identify as compared to patterns that emerge over time with a pseudo-random number sequence. As such, a chaotic sequence is characterized by a greater degree of randomness as compared to conventional pseudo-random number sequence. In this regard it will be appreciated that a chaotic sequence can advantageously be used in a cryptographic system having a high degree of security feature. A chaotic sequence can also be used in a variety of communications system applications. For example, a chaotic sequence is used to spread a signal's power over a wide band of frequencies or to frequency hop over a wide band of frequencies in a chaotic manner.

Figure 1:
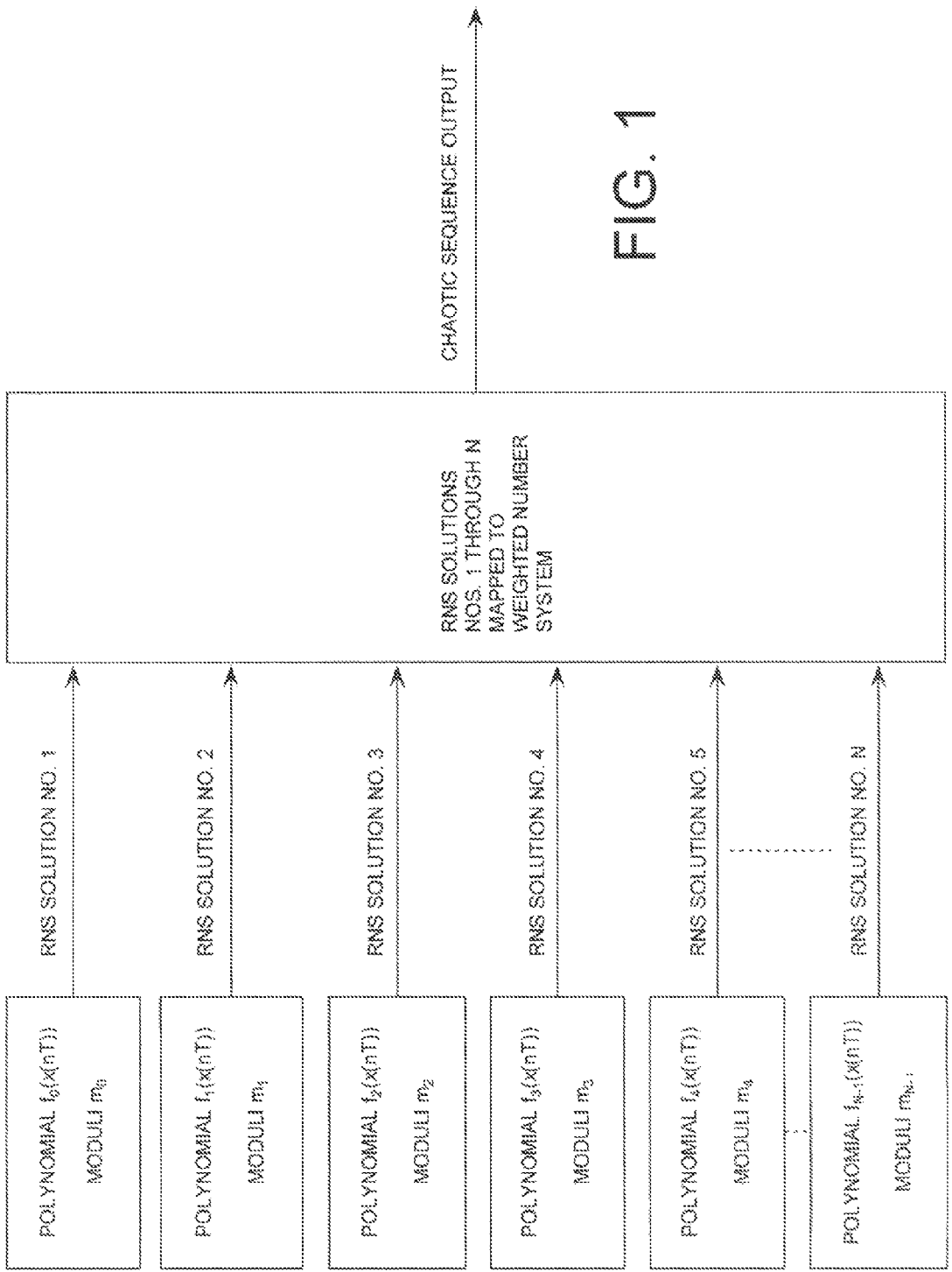
FIG. 1 is a conceptual diagram of a chaotic sequence generation that is useful for understanding the invention.

Referring now to FIG. 1, there is provided a conceptual diagram of a chaotic sequence generator that is useful for understanding the invention. As shown in FIG. 1, generation of the chaotic sequence begins with N polynomial equations $f_0(x(nT)), \ldots, f_{N-1}(x(nT))$. The N polynomial equations $f_0(x(nT)), \ldots, f_{N-1}(x(nT))$ can be selected as the same polynomial equation or as different polynomial equations. According to an aspect of the invention, the N polynomial equations $f_0(x(nT)), \ldots, f_{N-1}(x(nT))$ are selected as irreducible polynomial equations having chaotic properties in Galois field arithmetic. Such irreducible polynomial equations include, but are not limited to, irreducible cubic polynomial equations and irreducible quadratic polynomial equations. The phrase "irreducible polynomial equation" as used herein refers to a polynomial equation that cannot be expressed as a product of at least two nontrivial polynomial equations over the same Galois field (f). For example, the polynomial equation $f(x(nT))$ is irreducible if there does not exist two (2) non-constant polynomial equations $g(x(nT))$ and $h(x(nT))$ in $x(nT)$ with rational coefficients such that $f(x(nT))=g(x(nT)) \cdot h(x(nT))$.

As will be understood by a person skilled in the art, each of the N polynomial equations $f_0(x(nT)), \ldots, f_{N-1}(x(nT))$ can be solved independently to obtain a respective solution. Each solution can be expressed as a residue number system (RNS) residue value using RNS arithmetic operations, i.e. modulo operations. Modulo operations are well known to persons skilled in the art. Thus, such operations will not be described in great detail herein. However, it should be appreciated that a RNS residue representation for some weighted value "a" can be defined by mathematical Equation (1).

$$R = \{a \text{ modulo } m_0, a \text{ modulo } m_1, \ldots, a \text{ modulo } m_{N-1}\} \quad (1)$$

where R is a RNS residue N-tuple value representing a weighted value "a". Further, R(nT) can be a representation of the RNS solution of a polynomial equation $f(x(nT))$ defined as $R(nT)=\{f_0(x(nT)) \text{ modulo } m_0, f_1(x(nT)) \text{ modulo } m_1, \ldots, f_{N-1}(x(nT)) \text{ modulo } m_{N-1}\}$. $m_0, m_1, \ldots, m_{N-1}$ respectively are the moduli for RNS arithmetic operations applicable to each polynomial equation $f_0(x(nT)), \ldots, f_{N-1}(x(nT))$.

From the foregoing, it will be appreciated that the RNS employed for solving each of the polynomial equations $f_0(x(nT)), \ldots, f_{N-1}(x(nT))$ respectively has a selected modulus value $m_0, m_1, \ldots, m_{N-1}$. The modulus value chosen for each RNS moduli is preferably selected to be relatively prime numbers $p_0, p_1, \ldots, p_{N-1}$. The phrase "relatively prime numbers" as used herein refers to a collection of natural numbers having no common divisors except one (1). Consequently, each RNS arithmetic operation employed for expressing a solution as a RNS residue value uses a different prime number $p_0, p_1, \ldots, p_{n-1}$ as a moduli $m_0, m_1, \ldots, m_{N-1}$.

Those skilled in the art will appreciate that the RNS residue value calculated as a solution to each one of the polynomial equations $f_0(x(nT)), \ldots, f_{N-1}(x(nT))$ will vary depending on the choice of prime numbers $p_0, p_1, \ldots, p_{N-1}$ selected as a moduli $m_0, m_1, \ldots, m_{N-1}$. Moreover, the range of values will depend on the choice of relatively prime numbers $p_0, p_1, \ldots, p_{N-1}$ selected as a moduli $m_0, m_1, \ldots, m_{N-1}$. For example, if the prime number five hundred three (503) is selected as modulus $m_0$, then an RNS solution for a first polynomial equation $f_0(x(nT))$ will have an integer value between zero (0) and five hundred two (502). Similarly, if the prime number four hundred ninety-one (491) is selected as modulus $m_1$, then the RNS solution for a second polynomial equation $f_1(x(nT))$ has an integer value between zero (0) and four hundred ninety (490).

According to an embodiment of the invention, each of the N polynomial equations $f_0(x(nT)), \ldots, f_{N-1}(x(nT))$ is selected as an irreducible cubic polynomial equation having chaotic properties in Galois field arithmetic. Each of the N polynomial equations $f_0(x(nT)), \ldots, f_{N-1}(x(nT))$ can also be selected to be a constant or varying function of time. The irreducible cubic polynomial equation is defined by a mathematical Equation (2).

$$f(x(nT))=Q(k)x^3(nT)+R(k)x^2(nT)+S(k)x(nT)+C(k,L) \quad (2)$$

where n is a sample time index value, k is a polynomial time index value. L is a constant component time index value, T is a fixed constant having a value representing a time interval or increment, Q, R, and S are coefficients that define the polynomial equation $f(x(nT))$. C is a coefficient of $x(nT)$ raised to a zero power and is therefore a constant for each polynomial characteristic. In a preferred embodiment, a value of C is selected which empirically is determined to produce an irreducible form of the stated polynomial equation $f(x(nT))$ for a particular prime modulus. For a given polynomial with fixed values for Q, R, and S more than one value of C can exist, each providing a unique iterative sequence. Still, the invention is not limited in this regard.

According to another embodiment of the invention, the N polynomial equations $f_0(x(nT)) \ldots f_{N-1}(x(nT))$ are identical exclusive of a constant value C. For example, a first polynomial equation $f_0(x(nT))$ is selected as $f_0(x(nT))=3x^3(nT)+3x^2(nT)+x(nT)+C_0$. A second polynomial equation $f_1(x(nT))$ is selected as $f_1(x(nT))=3x^3(nT)+3x^2(nT)+x(nT)+C_1$. A third polynomial equation $f_2(x(nT))$ is selected as $f_2(x(nT))=3x^3(nT)+3x^2(nT)+x(nT)+C_2$, and so on. Each of the constant values $C_0, C_1, \ldots, C_{N-1}$ is selected to produce an irreducible form in a residue ring of the stated polynomial equation $f(x(nT))=3x^3(nT)+3x^2(nT)+x(nT)+C$. In this regard, it should be appreciated that each of the constant values $C_0, C_1, \ldots, C_{N-1}$ is associated with a particular modulus $m_0, m_1, \ldots, m_{N-1}$ value to be used for RNS arithmetic operations when solving the polynomial equation $f(x(nT))$. Such constant values $C_0, C_1, \ldots, C_{N-1}$ and associated modulus $m_0, m_1, \ldots, m_{N-1}$ values which produce an irreducible form of the stated polynomial equation $f(x(nT))$ are listed in the following Table (1).

TABLE 1

| Moduli values $m_0, m_1, \ldots, m_{N-1}$: | Sets of constant values $C_0, C_1, \ldots, C_{N-1}$: |
|---|---|
| 3 | {1, 2} |
| 5 | {1, 3} |
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 38, 77, 90} |
| 137 | {50, 117} |
| 149 | {17, 115, 136, 145} |
| 167 | {16, 32, 116, 132} |
| 173 | {72, 139} |
| 197 | {13, 96, 127, 179} |
| 233 | {52, 77} |
| 251 | {39, 100, 147, 243} |
| 257 | {110, 118} |
| 269 | {69, 80} |
| 281 | {95, 248} |
| 293 | {37, 223} |
| 311 | {107, 169} |
| 317 | {15, 55} |
| 347 | {89, 219} |
| 443 | {135, 247, 294, 406} |
| 461 | {240, 323} |
| 467 | {15, 244, 301, 425} |
| 479 | {233, 352} |

TABLE 1-continued

| Moduli values $m_0, m_1, \ldots, m_{N-1}$: | Sets of constant values $C_0, C_1, \ldots, C_{N-1}$: |
|---|---|
| 491 | {202, 234} |
| 503 | {8, 271} |

Still, the invention is not limited in this regard.

The number of discrete magnitude states (dynamic range) that can be generated with the system shown in FIG. 1 will depend on the quantity of polynomial equations N and the modulus values $m_0, m_1, \ldots, m_{N-1}$ values selected for the RNS number systems. In particular, this value can be calculated as the product $M=m_0 \cdot m_1, \cdot m_3 \cdot m_4 \cdot \ldots \cdot m_{N-1}$.

Referring again to FIG. 1, it should be appreciated that each of the RNS solutions Nos. 1 through N is expressed in a binary number system representation. As such, each of the RNS solutions Nos. 1 through N is a binary sequence of bits. Each bit of the sequence has a zero (0) value or a one (1) value. Each binary sequence has a bit length selected in accordance with a particular moduli.

According to an embodiment of the invention, each binary sequence representing a residue value has a bit length (BL) defined by a mathematical Equation (3).

$$BL=Ceiling[Log\ 2(m)] \quad (3)$$

where m is selected as one of moduli $m_0, m_1, \ldots, m_{N-1}$. Ceiling[u] refers to a next highest whole integer with respect to an argument u.

In order to better understand the foregoing concepts, an example is useful. In this example, six (8) relatively prime moduli are used to solve six (6) irreducible polynomial equations $f_0(x(nT)), \ldots, f_6(x(nT))$. A prime number $p_0$ associated with a first modulus $m_0$ is selected as five hundred three (503). A prime number $p_1$ associated with a second modulus $m_1$ is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0(x(nT))$ are in the range of zero (0) and five hundred two (502) which can be represented in nine (9) binary digits. Possible solutions for $f_1(x(nT))$ are in the range of zero (0) and four hundred ninety (490) which can be represented in nine (9) binary digits. Possible solutions for $f_2(x(nT))$ are in the range of zero (0) and four hundred seventy eight (478) which can be represented in nine (9) binary digits. Possible solutions for $f_3(x(nT))$ are in the range of zero (0) and four hundred sixty six (466) which can be represented in nine (9) binary digits. Possible solutions for $f_4(x(nT))$ are in the range of zero (0) and two hundred fifty six (256) which can be represented in nine (9) binary digits. Possible solutions for $f_5(x(nT))$ are in the range of zero (0) and two hundred fifty (250) which can be represented in eight (8) binary digits. Arithmetic for calculating the recursive solutions for polynomial equations $f_0(x(nT)), f_4(x(nT))$ requires nine (9) bit modulo arithmetic operations. The arithmetic for calculating the recursive solutions for polynomial equation $f_5(x(nT))$ requires eight (8) bit modulo arithmetic operations. In aggregate, the recursive results $f_0(x(nT)), \ldots, f_5(x(nT))$ represent values in the range from zero (0) to M−1. The value of M is calculated as follows: $p_0 \cdot p_1 \cdot p_2 \cdot p_3 \cdot p_4 \cdot p_5 = 503 \cdot 491 \cdot 479 \cdot 467 \cdot 257 \cdot 251 = 3,583,782,191,069,523$. The binary number system representation of each RNS solution can be computed using Ceiling[Log 2(3,563,782,191,059,523)]=Ceiling[51.66]=52 bits. Because each polynomial is irreducible, all 3,583,782,191,059,523 possible values are computed resulting in a sequence repetition time of M times T seconds, i.e, a sequence repetition times an interval of time between the computation of each values in the sequence of generated values. Still, the invention is not limited in this regard.

Referring again to FIG. 1, the RNS solutions Nos. 1 through N are mapped to a weighted number system representation thereby forming a chaotic sequence output. The phrase "weighted number system" as used herein refers to a number system other than a residue number system. Such weighted number systems include, but are not limited to, an integer number system, a binary number system, an octal number system, and a hexadecimal number system.

According to an aspect of the invention, the RNS solutions Nos. 1 through N are mapped to a weighted number system representation by determining a series of digits in the weighted number system based on the RNS solutions Nos. 1 through N. The term "digit" as used herein refers to a symbol of a combination of symbols to represent a number. For example, a digit can be a particular bit of a binary sequence. According to another aspect of the invention, the RNS solutions Nos. 1 through N are mapped to a weighted number system representation by identifying a number in the weighted number system that is defined by the RNS solutions Nos. 1 through N. According to yet another aspect of the invention, the RNS solutions Nos. 1 through N are mapped to a weighted number system representation by identifying a truncated portion of a number in the weighted number system that is defined by the RNS solutions Nos. 1 through N. The truncated portion can include any serially arranged set of digits of the number in the weighted number system. The truncated portion can also be exclusive of a most significant digit of the number in the weighted number system. The phrase "truncated portion" as used herein refers to a chaotic sequence with one or more digits removed from its beginning and/or ending. The phrase "truncated portion" also refers to a segment including a defined number of digits extracted from a chaotic sequence. The phrase "truncated portion" also refers to a result of a partial mapping of the RNS solutions Nos. 1 through H to a weighted number system representation.

According to an embodiment of the invention, a mixed-radix conversion method is used for mapping RNS solutions Nos. 1 through N to a weighted number system representation. "The mixed-radix conversion procedure to be described here can be implemented in" [modulo moduli only and not modulo the product of moduli.] See *Residue Arithmetic and Its Applications To Computer Technology*, written by Nicholas S. Szabo & Richard I. Tanaka, McGraw-Hill Book Co., New York, 1967, [In a mixed-radix number system,] "a number x may be expressed in a mixed-radix form:

$$x = a_N \prod_{i=1}^{N-1} R_i + \ldots + a_3 R_1 R_2 + a_2 R_1 + a_1$$

where the $R_i$ are the radices, the $a_i$ are the mixed-radix digits, and $0 \leq a_i < R_i$. For a given set of radices, the mixed-radix representation of x is denoted by $(a_n, a_{n-1}, \ldots, a_1)$ where the digits are listed order of decreasing significance," See id. "The multipliers of the digits $a_i$ are the mixed-radix weights where the weight of $a_i$ is $$\prod_{j=1}^{i-1} R_j \text{ for } j \ne 1. \text{" See Id.}$$

For conversion from the RNS to a mixed-radix system, a set of moduli are chosen so that $m_i = R_i$. A set of moduli are also chosen so that a mixed-radix system and a RNS are said to be associated. "In this case, the associated systems have the same range of values, that is $$\prod_{i=1}^{N} m_1.$$

The mixed-radix conversion process described here may then be used to convert from the [RNS] to the mixed-radix system." See Id.

"If $m_i = R_i$, then the mixed-radix expression is of the form:

$$x = a_N \prod_{i=1}^{N-1} m_1 + \ldots + a_3 m_1 m_2 + a_2 m_1 + a_1$$

where $a_i$ are the mixed-radix coefficients. The $a_i$ are determined sequentially in the following manner, starting with $a_1$." See Id.

$$x = a_N \prod_{i=1}^{N-1} m_1 + \ldots + a_3 m_1 m_2 + a_2 m_1 + a_1$$

is first taken modulo $m_1$. "Since all terms except the last are multiples of $m_1$, we have $\langle x \rangle_{m_1} = a_1$. Hence, $a_1$ is just the first residue digit." See Id.

"To obtain $a_2$, one first forms $x - a_1$ in its residue code. The quantity $x - a_1$ is obviously divisible by $m_1$. Furthermore, $m_1$ is relatively prime to all other moduli, by definition. Hence, the division remainder zero procedure [Division where the dividend is known to be an integer multiple of the divisor and the divisor is known to be relatively prime to M] can be used to find the residue digits of order 2 through N of $$\frac{x - a_1}{m_1}$$

Inspection of $$\left[ x = a_N \prod_{i=1}^{N-1} m_1 + \ldots + a_3 m_1 m_2 + a_2 m_1 + a_1 \right]$$

shows then that x is $a_2$. In this way, by successive subtracting and dividing in residue notation, all of the mixed-radix digits may be obtained." See Id.

"It is interesting to note that $$a_\gamma = \langle x \rangle_{m_1}, a_2 = \left\langle \left\lfloor \frac{x}{m_1} \right\rfloor \right\rangle_{m_2} * a_3 = \left\langle \left\lfloor \frac{x}{m_1 m_2} \right\rfloor \right\rangle_{m_3}$$

and in general for $i > 1$ $$a_\gamma = \left\langle \left\lfloor \frac{x}{m_1 m_2 \ldots m_{i-1}} \right\rfloor \right\rangle_{m_1}."$$

See Id. From the preceding description it is seen that the mixed-radix conversion process is iterative. The conversion can he modified to yield a truncated result. Still the invention is not limited in this regard.

According to another embodiment of the invention, a Chinese remainder theorem (CRT) arithmetic operation is used to map the RNS solutions Nos. 1 through H to a weighted number system representation. The CRT arithmetic operation is well known in the art and therefore will not he described here in detail. However, a brief discussion of how the CRT is applied may be helpful for understanding the invention. The CRT arithmetic operation can be defined by a mathematical Equation (4).

$$Y = \left\{ \begin{array}{c} \left\langle \left[ \begin{array}{c} 3x_0^3((n-1)T) + 3x_0^2((n-1)T) + \\ x_0((n-1)T) + C_0(nT) \end{array} \right] b_0 \right\rangle_{p_0} \frac{M}{P_0} \right\rangle_m + \ldots + \\ \left\langle \left[ \begin{array}{c} 3x_{N-1}^3((n-1)T) + 3_{N-1}^2((n-1)T) + \\ x_{N-1}((n-1)T) + C_{N-1}(nT) \end{array} \right] b_{N-1} \right\rangle_{p_{N-1}} \frac{M}{p_{N-1}} \right\rangle_M \end{array} \right\} \quad (4)$$

Mathematical Equation (4) can be re-written as mathematical Equation (5).

$$Y = \left\{ \begin{array}{c} \left\langle \left[ \begin{array}{c} 3x_0^3((n-1)T) + 3x_0^2((n-1)T) + \\ x_0((n-1)T) + C_0(nT) \end{array} \right] b_0 \right\rangle_{p_0} \frac{M}{p_0} + \ldots + \\ \left\langle \left[ \begin{array}{c} 3x_{N-1}^3((n-1)T) + 3x_{N-1}^2((n-1)T) + \\ x_{N-1}((n-1)T) + C_{N-1}(nT) \end{array} \right] b_{N-1} \right\rangle_{p_{N-1}} \frac{M}{p_{N-1}} \end{array} \right\}_M \quad (5)$$

where Y is the result of the CRT arithmetic operation, n is a sample time index value. T is a fixed constant having a value representing a time interval or increment. $x_0 - x_{N-1}$ are RNS solutions Nos. 1 through N. $p_0, p_1, \ldots, p_{N-1}$ are prime number moduli. M is a fixed constant defined by a product of the relatively prime numbers $p_0, p_1, \ldots p_{N-1}$. $b_0, b_1, \ldots, b_{N-1}$ are fixed constants that are chosen as the multiplicative inverses of the product of all other primes modulo $p_0, p_1, \ldots, p_{N-1}$, respectively. Equivalently, $$b_j = \left( \frac{M}{p_j} \right)^{-1} \mod p_j.$$

The $b_j$'s enable an isomorphic and equal mapping between an RNS N-tuple value representing a weighted number and said weighted number. However without loss of chaotic properties, the mapping need only be unique and isomorphic. As such, a weighted number x can map into a tuple y. The tuple y can map into a weighted number z. The weighted number x is not equal to x as long as all tuples map into unique values for z in a range from zero (0) to M−1. Thus for certain embodiments of the present invention, the $b_j$'s can be defined as $$b_j = \left(\frac{M}{p_j}\right)^{-1} \mod p_j.$$

In other embodiments of the present invention, all $b_j$'s can be set equal to one or more values without loss of the chaotic properties.

As should be appreciated, the chaotic sequence output Y can be expressed in a binary number system representation. As such, the chaotic sequence output Y can be represented as a binary sequence. Each bit of the binary sequence has a zero (0) value or a one (1) value. The chaotic sequence output Y can have a maximum bit length (MBL) defined by a mathematical Equation (6).

$$\text{MBL} = \text{Ceiling}[\text{Log } 2(M-1)] \quad (6)$$

where M is the product of the relatively prime numbers $p_0$, $p_1, \ldots, p_{N-1}$ selected as moduli $m_0, m_1, \ldots, m_{N-1}$. In this regard, it should be appreciated the M represents a dynamic range of a CRT arithmetic operation. The phrase "dynamic range" as used herein refers to a maximum possible range of outcome values of a CRT arithmetic operation. It should also be appreciated that the CRT arithmetic operation generates a chaotic numerical sequence with a periodicity equal to the inverse of the dynamic range M. The dynamic range requires a Ceiling[Log 2(M)] bit precision.

According to an embodiment of the invention, M equals three quadrillion five hundred sixty-three trillion seven hundred sixty-two billion one hundred ninety-one million fifty-nine thousand five hundred twenty-three (3,583,782,191,059, 523). By substituting the value of M into Equation (6), the bit length (BL) for a chaotic sequence output Y expressed in a binary system representation can be calculated as follows: BL=Ceiling[Log 2(3,563,762,191,059,523)=52 bits. As such, the chaotic sequence output Y is a fifty-two (52) bit binary sequence having an integer value between zero (0) and three quadrillion five hundred sixty-three trillion seven hundred sixty-two billion one hundred ninety-one million fifty-nine thousand five hundred twenty-two (3,583,762,191,059, 522), inclusive. Still, the invention is not limited in this regard. For example, chaotic sequence output Y can be a binary sequence representing a truncated portion of a value between zero (0) and M−1. In such a scenario, the chaotic sequence output Y can have a bit length less than Ceiling[Log 2(M−1)]. It should be noted that while truncation affects the dynamic range of the system it has no effect on the periodicity of a generated sequence.

As should be appreciated, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical Equation (2) can be rewritten in a general iterative form: $f(x(nT)=Q(k)x^3((n-1)T)+R(k)x^2((n-1)T)+S(k)x((n-1)T)+C(k,L)$. For example, a fixed coefficient polynomial equation is selected as $f(x(n\cdot 1ms))=3x^3((n-1)\cdot 1 ms)+3x^2((n-1)\cdot 1 ms)+x((n-1)+1 ms)+8$ modulo 503. n is a variable having a value defined by an iteration being performed. x is a variable having a value allowable in a residue ring. In a first iteration, n equals one (1) and x is selected as two (2) which is allowable in a residue ring. By substituting the value of n and x info the stated polynomial equation $f(x(nT))$, a first solution having a value forty-six one (46) is obtained. In a second iteration, n is incremented by one and x equals the value of the first solution, i.e., forty-six (46) resulting in the solution 298, 410 mod 503 or one hundred thirty-one (131). In a third iteration, n is again incremented by one and x equals the value of the second solution.

Figure 2:
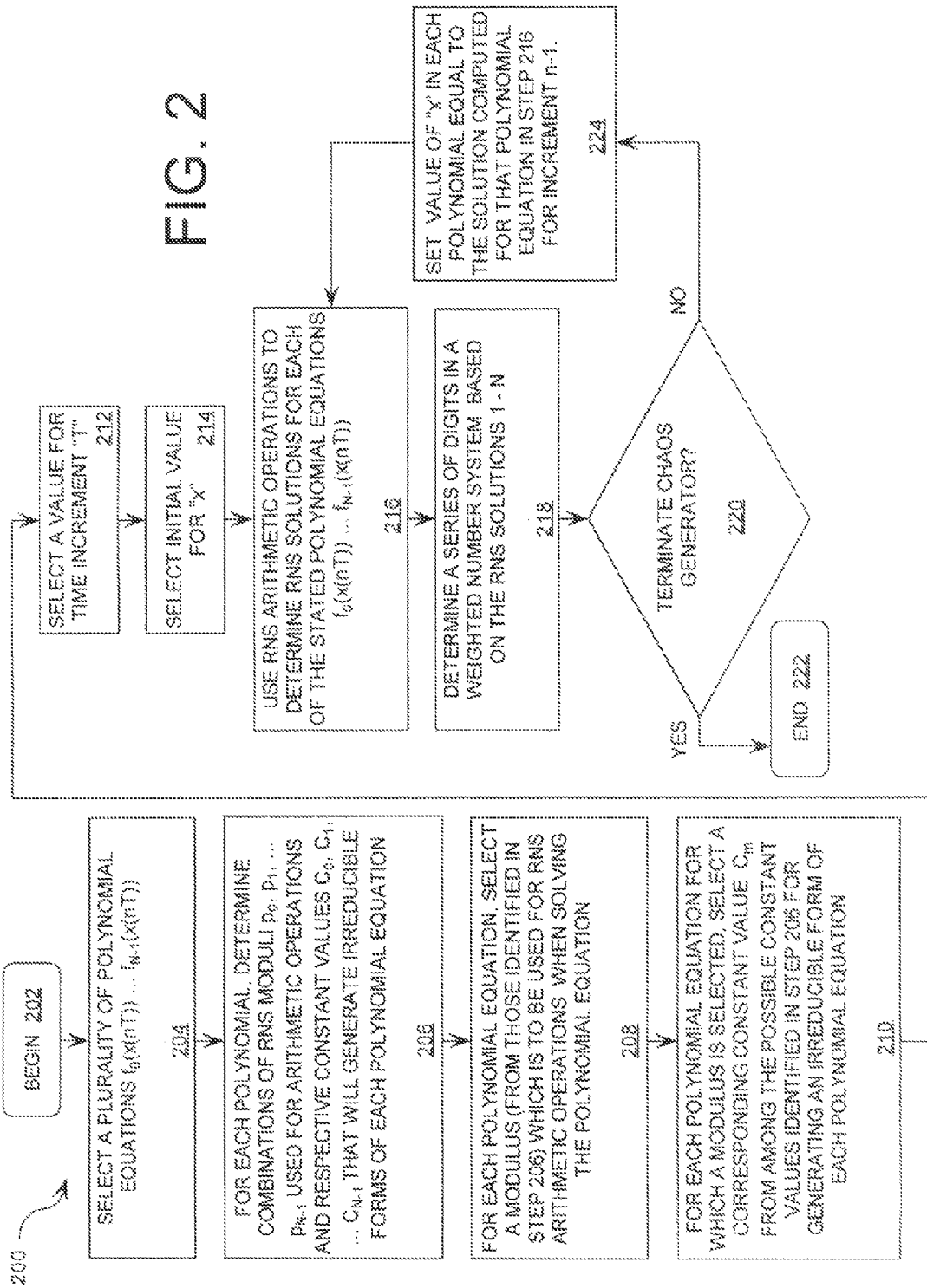
FIG. 2 is a flow diagram of a method for generating a chaotic sequence that is useful for understanding the invention.

Referring now to FIG. 2, there is provided a flow diagram of a method 200 for generating a chaotic sequence that is useful for understanding the invention. As shown in FIG. 2, the method 200 begins with step 202 and continues with step 204. In step 204, a plurality of polynomial equations $f_0(x(nT)), \ldots, f_{N-1}(x(nT))$ are selected. In this regard, it should be appreciated that the polynomial equations $f_0(x(nT)), \ldots, f_{N-1}(x(nT))$ can be selected as the same polynomial equation except for a different constant term or different polynomial equations. After step 204, step 206 is performed where a determination for each polynomial equation $f_0(x(nT)), \ldots, f_{N-1}(x(nT))$ is made as to which combinations of RNS moduli $m_0, m_1, \ldots, m_{N-1}$ used for arithmetic operations and respective constant values $C_0, C_1, \ldots, C_{N-1}$ generate irreducible forms of each polynomial equation $f_0(x(nT)), \ldots, f_{N-1}(x(nT))$. In step 208, a modulus is selected for each polynomial equation $f_0(x(nT)), \ldots, f_{N-1}(x(nT))$ that is to be used for RNS arithmetic operations when solving the polynomial equation $f_0(x(nT)), \ldots, f_{N-1}(x(nT))$. In this regard, it should be appreciated that the modulus is selected from the moduli identified in step 206. It should also be appreciated that a different modulus must be selected for each polynomial equation $f_0(x(nT)), \ldots, f_{N-1}(x(nT))$.

As shown in FIG. 2, the method 200 continues with a step 210. In step 210, a constant $C_m$ is selected for each polynomial equation $f_0(x(nT)), \ldots, f_{N-1}(x(nT))$ for which a modulus is selected. Each constant $C_m$ corresponds to the modulus selected for the respective polynomial equation $f_0(x(nT)), \ldots, f_{N-1}(x(nT))$. Each constant $C_m$ is selected from among the possible constant values identified in step 206 for generating an irreducible form of the respective polynomial equation $f_0(x(nT)), \ldots, f_{N-1}(x(nT))$.

After step 210, the method 200 continues with step 212. In step 212, a value for time increment "T" is selected. Thereafter, an initial value for "x" is selected. In this regard, it should be appreciated that the initial value for "x" can be any value allowable in a residue ring. Subsequently, step 216 is performed where RNS arithmetic operations are used to iteratively determine RNS solutions for each of the stated polynomial equations $f_0(x(nT)), \ldots, f_{N-1}(x(nT))$. In step 218, a series of digits in a weighted number system are determined based in the RNS solutions. This step can involve performing a mixed radix arithmetic operation or a CRT arithmetic operation using the RNS solutions to obtain a chaotic sequence output.

After step 218, the method 200 continues with a decision step 220. If a chaos generator is not terminated (220:NO), then step 224 is performed where a value of "x" in each polynomial equation $f_0(x(nT)), \ldots, f_{N-1}(x(nT))$ is set equal to the RNS solution computed for the respective polynomial equation $f_0(x(nT)), \ldots, f_{N-1}(x(nT))$ in step 216. Subsequently, the method 200 returns to step 216. If the chaos generator is terminated (220:YES); then step 222 is performed where the method 200 ends.

A person skilled in the art will appreciate that the method 200 is one architecture of a method for generating a chaotic sequence. However, the invention is not limited in this regard and any other method for generating a chaotic sequence can be used without limitation.

Figure 3:
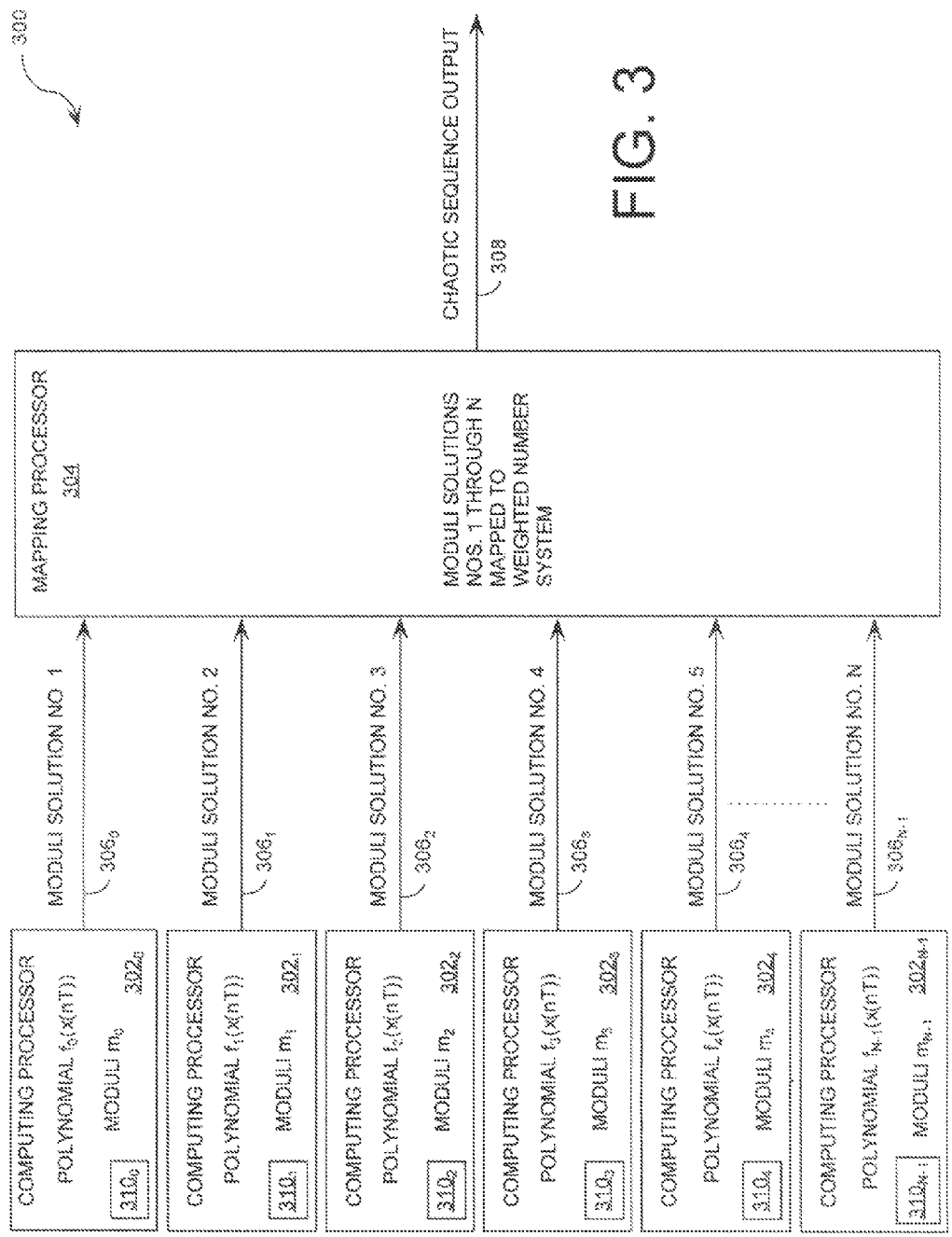
FIG. 3 is a block diagram of a chaotic sequence generator that is useful for understanding the invention.

Referring now to FIG. 3, there is illustrated one embodiment of a chaotic sequence generator 300 which could be used to implement the inventive arrangements. The chaotic sequence generator 300 is comprised of hardware and/or software configured to generate a digital chaotic sequence. In this regard, it should be appreciated that the chaotic sequence generator 300 is comprised of computing processors $302_0$-$302_{N-1}$. The chaotic sequence generator 300 is also comprised of a mapping processor 304. Each computing processor $302_0$-$302_{N-1}$ is coupled to the mapping processor 304 by a respective data bus $306_0$-$306_{N-1}$. As such, each computing processor $302_0$-$302_{N-1}$ is configured to communicate data to the mapping processor 304 via a respective data bus $306_0$-$306_{N-1}$. The mapping processor 304 can be coupled to an external device (not shown) via a data bus 308. In this regard, it should be appreciated that the external device (not shown) includes, but is not limited to, a communications device configured to combine or modify a signal in accordance with a chaotic sequence output.

Referring again to FIG. 3, the computing processors $302_0$-$302_{N-1}$ are comprised of hardware and/or software configured to solve N polynomial equations $f_0(x(nT)), \ldots, f_{N-1}(x(nT))$ to obtain a plurality of solutions. The N polynomial equations $f_0(x(nT)), \ldots, f_{N-1}(x(nT))$ can be irreducible polynomial equations having chaotic properties in Galois field arithmetic. Such irreducible polynomial equations include, but are not limited to, irreducible cubic polynomial equations and irreducible quadratic polynomial equations. The N polynomial equations $f_0(x(nT) \ldots f_{N-1}(x(nT))$ can also be identical exclusive of a constant value. The constant value can be selected so that a polynomial equation $f_0(x(nT), \ldots, f_{N-1}(x(nT))$ is irreducible for a predefined modulus. The N polynomial equations $f_0(x(nT)), \ldots, f_{N-1}(x(nT))$ can further be selected as a constant or varying function of time.

Each of the solutions can be expressed as a unique residue number system (RNS) N-tuple representation. In this regard, it should be appreciated that the computing processors $302_0$-$302_{N-1}$ employ modulo operations to calculate a respective solution for each polynomial equation $f_0(x(nT)), \ldots, f_{N-1}(x(nT))$ using modulo based arithmetic operations. Each of the computing processors $302_0$-$302_{N-1}$ are comprised of hardware and/or software configured to utilize a different relatively prime number $p_0, p_1, \ldots, p_{N-1}$ as a moduli $m_0, m_1, \ldots, m_{N-1}$ for modulo based arithmetic operations. The computing processors $302_0$-$302_{N-1}$ are also comprised of hardware and/or software configured to utilize modulus $m_0, m_1, \ldots, m_{N-1}$ selected for each polynomial equation $f_0(x(nT)), \ldots, f_{N-1}(x(nT))$ so that each polynomial equation $f_0(x(nT)), \ldots, f_{N-1}(x(nT))$ is irreducible. The computing processors $302_0$-$302_{N-1}$ are further comprised of hardware and/or software configured to utilize moduli $m_0, m_1, \ldots, m_{N-1}$ selected for each polynomial equation $f_0(x(nT)), \ldots, f_{N-1}(x(nT))$ so that solutions iteratively computed via a feedback mechanism $310_0$-$310_{N-1}$ are chaotic. In this regard, it should be appreciated that the feedback mechanisms $310_0$-$310_{N-1}$ are provided so that the solutions for each polynomial equation $f_0(x(nT)), \ldots, f_{N-1}(x(nT))$ can be iteratively computed. Accordingly, the feedback mechanisms $310_0$-$310_{N-1}$ are comprised of hardware and/or software configured to selectively define a variable "x" of a polynomial equation as a solution computed in a previous iteration.

Referring again to FIG. 3, the computing processors $302_0$-$302_{N-1}$ are further comprised of hardware and/or software configured to express each of the RNS residue values in a binary number system representation. In this regard, the computing processors $302_0$-$302_{N-1}$ can employ an RNS-to-binary conversion method. Such methods are generally known to persons skilled in the art and therefore will not be described in great detail herein. However, it should be appreciated that any such method can be used without limitation. It should also be appreciated that the residue values expressed in binary number system representations are hereinafter referred to as moduli solutions Nos. 1 through N comprising the elements of an RNS N-tuple.

According to an embodiment of the invention, the computing processors $302_0$-$302_{N-1}$ are further comprised of memory based tables (not shown) containing pre-computed residue values in a binary number system representation. The address space of each memory table is at least from zero (0) to $m_m$ for all m, $m_0$ through $m_{N-1}$. On each iteration, the table address is used to initiate the sequence. Still, the invention is not limited in this regard.

Referring again to FIG. 3, the mapping processor 304 is comprised of hardware and/or software configured to map the moduli (RNS N-tuple) solutions Nos. 1 through N to a weighted number system representation. The result is a series of digits in the weighted number system based on the moduli solutions Nos. 1 through N. For example, the mapping processor 304 can be comprised of hardware and/or software configured to determine the series of digits in the weighted number system based on the RNS residue values using a Chinese Remainder Theorem process. In this regard, it will be appreciated by those skilled in the art that the mapping processor 304 is comprised of hardware and/or software configured to identify a number in the weighted number system that is defined by the moduli solutions Nos. 1 through N.

According to an aspect of the invention, the mapping processor 304 can be comprised of hardware and/or software configured to identify a truncated portion of a number in the weighted number system that is defined by the moduli solutions Nos. 1 through N. For example, the mapping processor 304 can also be comprised of hardware and/or software configured to select the truncated portion to include any serially arranged set of digits of the number in the weighted number system. Further, the mapping processor 304 can include hardware and/or software configured to select the truncated portion to be exclusive of a most significant digit when all possible weighted numbers represented by P bits are not mapped, i.e., when $M-1 < 2^P$. P is a fewest number of bits required to achieve a binary representation of the weighted numbers. Still, the invention is not limited in this regard.

Referring again to FIG. 3, the mapping processor 304 is comprised of hardware and/or software configured to express a chaotic sequence in a binary number system representation. In this regard, it should be appreciated that the mapping processor 304 can employ a weighted-to-binary conversion method. Such methods are generally known to persons skilled in the art and therefore will not be described in great detail herein. However, it should be appreciated that any such method can be used without limitation.

A person skilled in the art will appreciate that the chaotic generator 300 is one architecture of a chaotic generator. However, the invention is not limited in this regard and any other chaotic generator architecture can be used without limitation.

Figure 4:
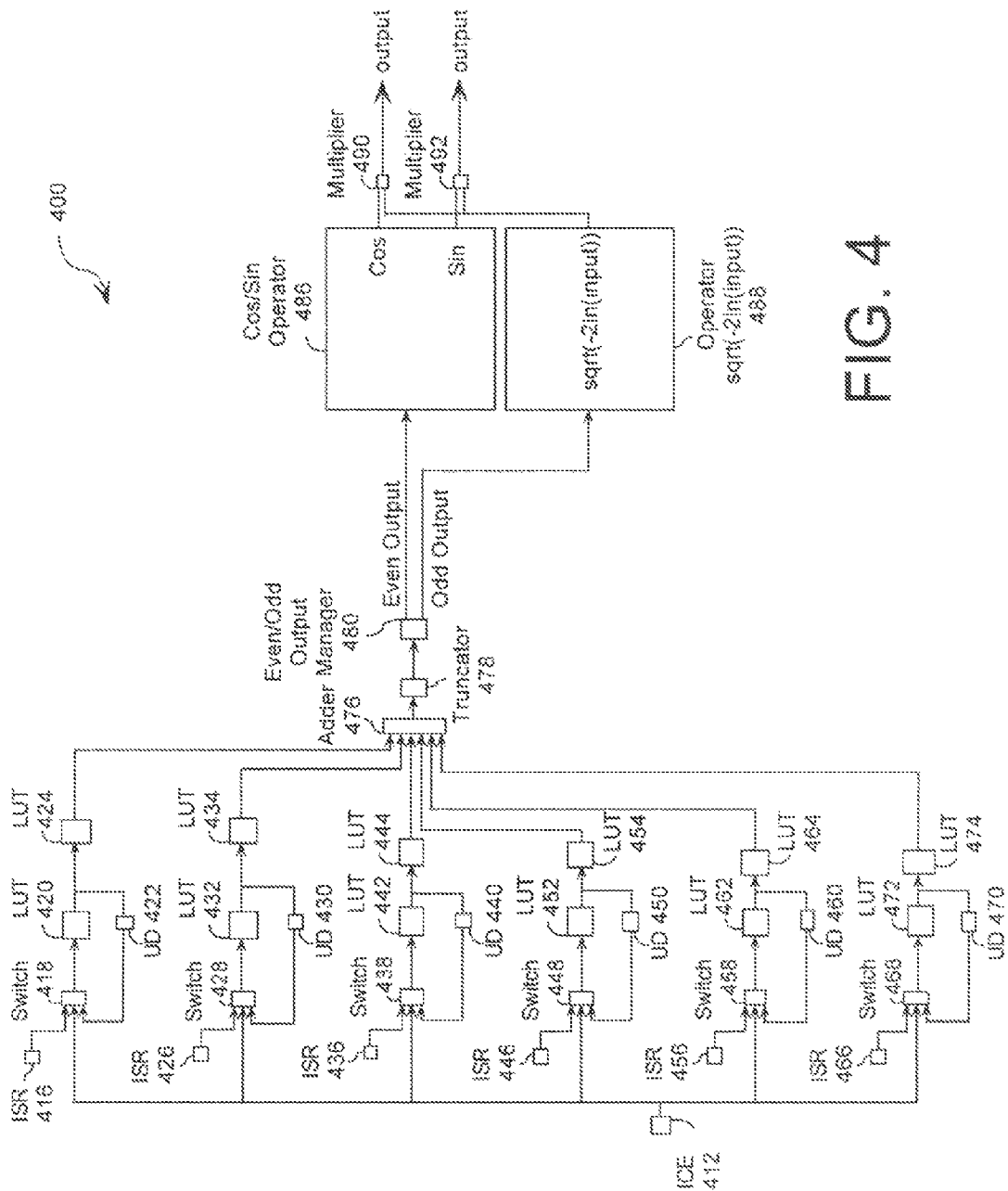
FIG. 4 is a block diagram of a chaotic sequence generator implementing memory based tables that is useful for understanding the invention.

A block diagram of an example chaotic sequence generator 400 implementing memory based tables is provided in FIG. 4. As shown in FIG. 4, the chaotic sequence generator 400 is comprised of an initial condition enable (ICE) 412, initial state registers (ISRs) 416, 426, 436, 446, 456, 466, switches 418, 428, 438, 448, 458, 468, unit delays 422, 430, 440, 450, 460, 470, and lookup tables 420, 424, 432, 434, 442, 444, 452, 454, 482, 484, 472, 474. The chaotic sequence generator 400 is also comprised of an adder 476, a truncator 478, an even/odd output manager 480, a cos/sin operator 486, a square root of a natural logarithm operator (square root operator) 488, and multipliers 490, 492. Each of the listed components 412 through 492 are well known to persons skilled in the art, and therefore will not be described in great detail herein. However, a brief description of the listed components 412 through 492 is provided to assist a reader in understanding the present invention.

Referring again to FIG. 4, each of the ISRs 416, 426, 436, 446, 456, 466 is comprised of hardware and software configured to store a set of initial conditions. The ISRs 416, 426, 436, 446, 456, 466 are also comprised of hardware and software configured to communicate a set of initial conditions to the switches 418, 428, 438, 448, 458, 468, respectively.

The ICE 412 is comprised of hardware and software configured to control the switches 418, 428, 438, 448, 458, 468. In this regard, it should be appreciated that the ICE 412 can generate a high voltage control signal and a low voltage control signal. The ICE 412 can also communicate control signals to the switches 418, 428, 438, 448, 458, 468. The switches 418, 428, 438, 448, 458, 468 are responsive to the control signals received from the ICE 412. For example, if the ICE 412 communicates a high control signal to the switch 418, then the switch 418 creates a path between the ISR 416 and the LUT 420. However, if the ICE 412 communicates a low control signal to the switch 418, then the switch 418 creates a path between the unit delay 422 and the LUT 420.

The unit delays 422, 430, 440, 450, 460, 470 and lookup tables 420, 432, 442, 452, 462, 472 provide feedback mechanisms for iterated computations of irreducible polynomial equations $f_0(x(nT)), \ldots, f_{N-1}(x(nT))$ modulo $m_0, m_1, \ldots, m_{N-1}$. In this regard, it should be understood that the lookup tables 420, 432, 442, 452, 482, 472 are comprised of hardware and software configured to perform lookup table operations for computing irreducible polynomial equations $f_0(x(nT)), \ldots, f_{N-1}(x(nT))$ modulo $m_0, m_1, \ldots, m_{N-1}$. The lookup tables 420, 432, 442, 452, 482, 472 are also comprised of hardware and software configured to communicate results of the computations to the lookup tables 424, 434, 444, 454, 484, 474, respectively. The lookup tables 424, 434, 444, 454, 464, 474 are comprised of hardware and software configured to perform lookup table operations for mapping the results into a desired weighted number system. The lookup tables 424, 434, 444, 454, 464, 474 are also comprised of hardware and software configured to communicate results expressed in a weighted number system representation to the adder 476.

The adder 478 is comprised of hardware and software configured to perform an addition operation. The addition operation involves combining the results expressed in a weighted number system representation to form a single output. The adder 476 is also comprised of hardware and software configured to communicate the single output to the truncator 478. The truncator 478 is comprised of hardware and software configured to identify a truncated portion of a number in the weighted number system that is defined by the single output of the adder 476. The truncator 478 is also comprised of hardware and software configured to communicate a truncated output to the even/odd output manager 480.

The even/odd output manager 480, the cos/sin operator 486, the square root operator 488, and the multipliers 490, 492 are provided to complete a bivariate Gaussian conversion of two (2) uniformly distributed random variables to a pair of quadrature Guassian output. In this regard, it should be appreciated that the even/odd output manager 480 is comprised of hardware and software configured to forward a truncated output having an even indexed value to the cos/sin operator 486. The even/odd output manager 480 is also comprised of hardware and software configured to forward a truncated output having an odd indexed value to the square root operator 488. The cos/sin operator 486 is comprised of hardware and software configured to perform a cosine operation and a sine operation using the even indexed truncated output received from the even/odd output manager 480. The cos/sin operator 486 is also comprised of hardware and software configured to communicate the result of the cosine operation to the multiplier 490 and the result of the sine operation to the multiplier 492.

The square root operator 488 is comprised of hardware and software configured to perform a square root of a natural logarithm operation using the odd indexed truncated output received from the even/odd output manager 480. The square root operation can be defined by a mathematical Equation (7).

$$R = \mathrm{sqrt}(-2 \ln(\text{odd indexed truncated output})) \tag{7}$$

where R is a result of a square root of a natural logarithm operation. The square root operator 488 is also comprised of hardware and software configured to communicate the result of the square root operation to the multipliers 490, 492.

The multiplier 490 is comprised of hardware and software configured to perform a multiplication operation for combining the result of the cosine operation and the result of the square root of a natural logarithm operation. The multiplier 490 is comprised of hardware and software configured to communicate a product of the multiplication operation to an external device (not shown). Similarly, the multiplier 492 is comprised of hardware and software configured to perform a multiplication operation for combining the result of the sine operation and the result of the square root of a natural logarithm operation. The multiplier 492 is comprised of hardware and software configured to communicate a product of the multiplication operation to an external device (not shown).

A person skilled in the art will appreciate that the chaotic sequence generator 400 is one architecture of a chaotic sequence generator. However, the invention is not limited in this regard and any other chaotic sequence generator architecture can be used without limitation.

According to one embodiment of the invention, the method described in FIG. 2 can continue with a further step of generating a chaotic communication signal using the chaotic sequence which is thus generated. In particular, a communication signal which is to be communicated from a transmitting device to a receiving device can be directly or indirectly modified using the chaotic sequence. For example, the chaotic sequence can be used to induce chaotic signal spreading over a range of different frequencies, a coherent chaos shift keying, a non-coherent chaos shift keying, and a differential code shift keying (DCSK). The chaotic sequence can also be used to generate a chaos encoded on-off keying, a chaos encoded frequency-modulated DCSK signal, a chaos encoded correlation delay shift keying signal, a chaos encoded symmetric code shift keying (CSK), and a chaos encoded quadrature CSK based communications system. In this regard it will be appreciated that the chaos sequence generated herein can be used in place of any pseudorandom sequence generated using conventional means.

In light of the foregoing description of the invention, it should be recognized that the present invention can be realized in hardware, software, or a combination of hardware and software. A method of generating a chaotic sequence according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Additionally, the description above is intended by way of example only and is not intended to limit the present invention in any way, except as set forth in the following claims, All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for generating a chaotic sequence in a communication system, comprising the steps of:
   concurrently solving, by said communication system, a plurality of different polynomial equations to obtain a plurality of solutions, each of said plurality of different polynomial equations having chaotic properties in Galois field arithmetic and having an input variable with a value equal to a residue value computed using a previous solution therefore;
   concurrently performing, by said communications system, a plurality of arithmetic operations to express said plurality of solutions as residue values;
   determining, by said communications system, a series of digits in a weighted number system based on said residue values; and
   combining, by said communication system, said series of digits with a sequence of symbols defining information to be transmitted from said communication system.

2. The method according to claim 1, further comprising using a Chinese Remainder Theorem process to perform said determining step.

3. The method according to claim 1, wherein said determining step further comprises identifying a number in said weighted number system that is defined by said residue values.

4. The method according to claim 1, wherein said determining step further comprises identifying a truncated portion of a number in said weighted number system that is defined by said residue values.

5. The method according to claim 4, further comprising selecting said truncated portion to include any serially arranged set of digits comprising a portion of said number in said weighted number system.

6. The method according to claim 5, further comprising selecting said truncated portion exclusive of a most significant digit comprising said number in said weighted number system.

7. The method according to claim 1, further comprising selecting a value for each of N moduli used to compute said residue values.

8. The method according to claim 7, further comprising selecting each said modulus for each of said plurality of different polynomial equations so that each said polynomial equation is irreducible.

9. The method according to claim 7, further comprising selecting each said modulus for each of said plurality of different polynomial equations so that solutions iteratively computed via a feedback mechanism for said polynomial equations are chaotic.

10. The method according to claim 1, further comprising selecting said plurality of different polynomial equations to include at least a cubic type polynomial equation.

11. The method according to claim 1, further comprising selecting each of said plurality of different polynomial equations to be identical exclusive of a constant value.

12. The method according to claim 11, further comprising selecting said constant value so that a polynomial equation is irreducible for a predefined modulus.

13. The method according to claim 1, further comprising selecting said polynomial equation to be at least one of a constant or varying function of time.

14. The method according to claim 1, further comprising iteratively computing said plurality of solutions using a feedback mechanism.

15. The method according to claim 14, further comprising selecting said feedback mechanism to include selectively defining a value of a variable of a polynomial equation for each solution iteratively computed, said value based on a previous iteratively computed solution of said polynomial equation.

16. The method according to claim 1, wherein said weighted number system is a binary number system.

17. A chaotic sequence generator, comprising:
   at least one electronic circuit configured for
      concurrently solving a plurality of different polynomial equations to obtain a plurality of solutions, each of said plurality of different polynomial equations having chaotic properties in Galois field arithmetic and having an input variable with a value equal to a residue value computed using a previous solution therefore,
      concurrently performing a plurality of arithmetic operations to express said plurality of solutions as residue values,
      determining a series of digits in a weighted number system based on said residue values, and
      combining said series of digits with a sequence of symbols defining information to be transmitted from said communication system.

18. The chaotic sequence generator according to claim 17, wherein said electronic circuit is further configured for determining a series of digits in said weighted number system based on said residue values using a Chinese Remainder Theorem process.

19. The chaotic sequence generator according to claim 17, wherein said electronic circuit is further configured for identifying a number in said weighted number system that is defined by said residue values.

20. The chaotic sequence generator according to claim 17, wherein said electronic circuit is further configured for identifying a truncated portion of a number in said weighted number system that defined by said residue values.

21. The chaotic sequence generator according to claim 20, wherein said electronic circuit is further configured for selecting said truncated portion to include any serially arranged set of digits comprising a portion of said number in said weighted number system.

22. The chaotic sequence generator according to claim 21, wherein said electronic circuit is further configured for selecting said truncated portion exclusive of a most significant digit when all possible weighted numbers are represented by P bits, said P is a fewest number of bits required to achieve a binary representation of said weighted numbers.

23. The chaotic sequence generator according to claim 17, wherein said electronic circuit is further configured for utilizing a modulus selected for each of said plurality of different polynomial equations so that each said polynomial equation is irreducible.

24. The chaotic sequence generator according to claim 17, wherein said electronic circuit is further configured for utilizing a modulus selected for each of said plurality of different polynomial equations so that solutions iteratively computed via a feedback mechanism for said polynomial equations are chaotic.

25. The chaotic sequence generator according to claim 17, wherein said plurality of different polynomial equations include at least a cubic type polynomial equation.

26. The chaotic sequence generator according to claim 17, wherein said plurality of different polynomial equations are identical exclusive of a constant value.

27. The chaotic sequence generator according to claim 26, wherein said constant value is selected so that a polynomial equation is irreducible for a predefined modulus.

28. The chaotic sequence generator according to claim 17, wherein said plurality of different polynomial equations are at least one of a constant or varying function of time.

29. The chaotic sequence generator according to claim 17, further comprising a feedback mechanism configured for selectively defining a variable "x" of a polynomial equation as a residue value computed in a previous iteration.

* * * * *